United States Patent

[11] 3,619,260

| [72] | Inventor | Gordon M. Parker |
| | | Harwick, Pa. |
| [21] | Appl. No. | 829,753 |
| [22] | Filed | June 2, 1969 |
| [45] | Patented | Nov. 9, 1971 |
| [73] | Assignee | PPG Industries, Inc |
| | | Pittsburgh, Pa. |

[54] POLYMERIZATION OF BIS-(ACRYLOXYALKYL) CARBONATES
4 Claims, No Drawings

[52] U.S. Cl.................................................... 117/93.31,
117/132, 117/138.8, 117/148, 117/161,
204/159.22, 204/159.23, 260/77.5, 260/463
[51] Int. Cl........................................................ C08f 1/16,
C07c 69/54
[50] Field of Search............................................ 260/77.5 U,
463; 204/159.22; 117/93.31

[56] References Cited

UNITED STATES PATENTS

| 2,384,124 | 9/1945 | Muskat et al. ............... | 260/77.5 |
| 2,575,585 | 11/1951 | Cox et al...................... | 260/77.5 |

FOREIGN PATENTS

| 606,716 | 8/1948 | Great Britain................ | 260/77.5 |

*Primary Examiner* — Samuel H. Blech
*Attorney* — Chisholm and Spencer

ABSTRACT: Phosgene is reacted with acrylates or methacrylates containing one hydroxyl group in the presence of an acid acceptor to form the novel bis-(acryloxyalkyl) carbonates of this invention. The product is highly radiation sensitive so that it may be polymerized by ionizing radiation and forms a coating which is hard and stain resistant.

POLYMERIZATION OF BIS-(ACRYLOXYALKYL) CARBONATES

This invention in general deals with novel compounds which are highly radiation-sensitive. The novel compounds are complex acrylate or methacrylate esters containing carbonate linkages. These esters when subjected to low dosages of ionizing radiation, polymerize to form extremely strong and stain resistant materials.

The novel compounds produced in accordance with this invention are complex acrylate or methacrylate esters containing carbonate linkages which are derived from the reaction of phosgene with mono-, di- or triacrylates or methacrylates containing one hydroxyl group.

The mono-, di- or triacrylates that are reacted with phosgene contain one hydroxyl group which contains the only active hydrogen atom in the compound. In other words, the compound may not contain other groups having reactive hydrogen atoms such as amines, thiols, and the like. The most preferred of these acrylates are monoacrylates such as hydroxyalkyl acrylates and hydroxyalkyl methacrylates. Generally, these preferred acrylates and methacrylates are of the formula

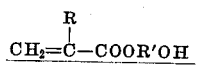

$$CH_2=\overset{R}{\underset{|}{C}}-COOR'OH$$

where R is selected from the group consisting of hydrogen and methyl, and R' is a substituted or unsubstituted alkylene radical having from about 2 to about 16 carbon atoms. R' may be substituted with groups such as phenoxy, halogen, nitrile, nitro, and the like. Examples of these compounds are hydroxyethyl acrylate, hydroxyethyl methacrylate, hydroxybutyl acrylate, hydroxylauryl acrylate, hydroxylauryl methacrylate, hydroxy-2,4,4,-trimethylpentyl acrylate, hydroxy-2,4,4-trimethylpentyl methacrylate, 2-hydroxy, 3-phenoxypropyl acrylate, and the like.

Other acrylates having one hydroxyl group which may be used are the di- and triacrylates, such as 1, 3 -glycerol diacrylate, 1, 3 -glycerol dimethacrylate, pentaerythritol triacrylate, trimethylol propane diacrylate, and the like.

It is noted that the term "acrylates," as broadly used, is meant to include both acrylates and methacrylates.

The reaction takes place in the presence of an acid acceptor. The acid acceptor is employed to preferentially react with the hydrochloric acid that is evolved during the reaction thereby preventing hydrochloric acid addition to the double bond of the monomer. An acid acceptor may be used, but it is preferable to use an aqueous base or a tertiary amine. Examples of typical acid acceptors that may be used are pyridine, trimethylamine, aqueous sodium carbonate, triethylamine, aqueous sodium hydroxide, aqueous potassium hydroxide, calcium hydroxide, magnesium hydroxide, barium hydroxide, and the like.

A solvent is generally used for the acrylate so that the resulting salt is dispersed and the product is more easily filtered out, thus giving a better yield. Any solvent that is insoluble in water and unreactive with phosgene may be used. The preferred solvents are benzene, acetone, pyridine, dioxane, toluene, ethyl acetate, methylene chloride, trichloroethylene, and the like.

The reaction is preferably carried out by adding phosgene to a solvent solution of the acrylate in the presence of an acid acceptor, such as pyridine. Generally, it is preferred to react the phosgene and acrylate at low temperatures or from about −10° C. to about 25° C. It is noted that the reaction is exothermic and the rate of phosgene addition should be controlled so that the temperature of the reaction mixture does not rise excessively; the temperature is usually kept below 50° C.

The proportions of the components may be varied over a wide range, but generally, one mole of phosgene is reacted with every two moles of acrylate. It is preferred to use a slight excess of phosgene, but the relative amounts of the components are not critical. Also, it is preferable to use at least two moles of acid acceptor for every one mole of phosgene so that all the hydrochloric acid generated will be tied up.

The product of the reaction is recovered by conventional means. Ordinarily the product is filtered, washed and dried. The remaining solvent can be removed, if desired, by stripping.

The product obtained is a reactive monomer which can be polymerized alone or with other monomers to give polymers of useful properties. The polymerization can be carried out by various techniques, such as by use of peroxides or other free radical initiators, by the use of heat or actinic light or by subjecting the monomers or mixtures of monomers to ionizing irradiation.

Because the monomers prepared in this manner are extremely radiation-sensitive and since radiation sensitivity is difficult to achieve, it is highly advantageous to polymerize the monomers herein by subjecting them to ionizing irradiation.

The term "irradiation," as used herein, means high energy radiation and/or the secondary energies resulting from conversion of practice or other particle energy to X-rays or gamma radiation. While various types of irradiation are suitable for this purpose, such as X-ray and gamma rays, the radiation produced by accelerated high energy electrons has been found to be very conveniently and economically applicable and to give very satisfactory results. However, regardless of the type of radiation and the type of equipment used for its generation or application, the use thereof in the practice of the invention as described herein is contemplated as falling within the scope of this invention so long as the ionization radiation is equivalent to at least about 100,000 electron volts.

While there is no upper limit to the electron energy that can be so applied advantageously, the effects desired in the practice of this invention can be accomplished without having to go to above about 20,000,000 electron volts. Generally, the higher the electron energy used, the greater is the depth of penetration into the massive structure of the materials to be treated. For other types of radiation, such as gamma and X-ray, energy systems equivalent to the above range of electron volts are desirable.

It is intended that the term "irradiation" include what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van der Graaff generators, betatrons, synchrotrons, cyclotrons, etc. Neutron radiation can be produced by bombarding a selected light metal such as beryllium with positive particles of high energy. Particle radiation can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to irradiation of this type, commonly called X-ray, an ionizing electromagnetic irradiation suitable for the practice of this invention can be obtained by means of a nuclear reactor (pile) or by the use of natural or synthetic radioactive material, for example, cobalt 60.

Various types of high power electron linear accelerators are commercially available, for example, the ARCO type travelling wave accelerator, model Mark I, operating at 3 to 10 million electron volts, such as supplied by High Voltage Engineering Corporation, Burlington, Massachusetts, or other types of accelerators as described in U. S. Pat. No. 2,763,609 and in British Pat. No. 762,953 are satisfactory for the practice of this invention.

The monomers described herein will polymerize acceptably using any total dosage between about 0.2 megarad and about 20 megarads. A "rad" is defined as that amount of radiation required to supply 100 ergs per gram of material being treated, and a "megarad" is $10^6$ rads. The total dosage is the total amount of irradiation received by the monomer.

The monomers of this invention may be copolymerized with comonomers to form radiation-sensitive materials with varying properties. The monomer need only be mixed with any comonomer and copolymerized by conventional means or the mixtures may be copolymerized by subjecting the mixtures to actinic light or to ionizing irradiation. Examples of comonomers which may be copolymerized with the complex acrylate esters of this invention are: acrylates such as methyl acrylate, ethyl acrylate, di-acrylates such as glycerol diacrylate, methacrylates such as methyl methacrylate, ethyl methacrylate, etc., and vinyl compounds such as vinyl acetate, acrylonitrile, styrene, and the like. These mixtures may be used in any proportions desirable.

The coatings may be formed by coating the monomer onto a substrate by any conventional coating means, such as roller coating, curtain coating, brushing, spraying, etc. The coated article may then be cured either by adding peroxide to the coating and heating, or by subjecting the coating to actinic light or to ionizing irradiation. It is noted that many of the monomers have extremely low viscosity, thus insuring easy application if the product is to be used as a coating.

The use of ionizing irradiation to polymerize the monomers is preferred as this method makes it possible to polymerize the coatings at extremely high speeds and thus eliminate the time-consuming baking steps, and as the use of ionizing irradiation requires no heating, the danger of high temperatures damaging a heat-sensitive substrate is eliminated.

It is also noted that the use of ionizing irradiation requires no solvents, thus reducing the danger of poisonous and expolosive solvent vapors and that the coatings formed by the use of ionizing irradiation are more highly cross-linked and are generally stronger coatings than the conventionally cured coatings. It is further noted that the monomers of this invention may be coated onto plastic substrates and subjected to ionizing irradiation to form a chemical graft between the coating and substrate thus insuring a strong bond between coating and substrate.

The following examples set forth specific embodiments of the instant invention. However, the invention is not to be construed as being limited to these embodiments for there are, of course, numerous possible variations and modifications. All parts and percentages in the examples, as well as throughout the specification, are by weight unless otherwise indicated.

EXAMPLE 1

A flask fitted with a dry ice condenser was cooled to 0° C. and to the flask were added 232 grams of 2-hydroxyethyl acrylate, 150 grams of trimethylamine, and 250 milliliters of benzene. Phosgene gas was bubbled through the mixture at the rate of approximately 2 grams per minute. At the end of 46 minutes, the temperature of the reactants was 8° C. and 99 grams of phosgene had been added. The product was filtered and washed with 3 percent hydrochloric acid solution and rewashed with water, and then washed with dilute, aqueous sodium hydroxide and finally washed with water again. The pH was 7.0. The product was stripped and the resulting bis-(acryloxyethyl) carbonate monomer (a water white liquid of low viscosity) had a hydroxy value of 0. The yield was 39 percent.

EXAMPLE 2

A flask fitted with a dry ice condenser was cooled to 10° C. and to the flask were added 1910 grams of an alkyl acrylate, 600 grams of pyridine, 2000 milliliters of benzene, and 2 grams of ditertiary butyl para-cresol as an inhibitor.

The alkyl acrylate was prepared by charging a vessel with 935 grams of acrylic acid and 8 grams of ditertiary butyl para-cresol, and heating to 110° C. Thirty-one hundred and eighty parts of a glycidyl ester of a tertiary carboxylic acid having from eight to 10 carbon atoms ("Cardura E") were added over a 1 hour period and the reactants were cooked to an acid value of less than 5.

Phosgene gas was bubbled through the mixture of acrylate, pyridine, benzene, and ditertiary butyl para-cresol at the rate of approximately 2 grams per minute until 297 grams of phosgene were added. The temperature was 5° C. The product was washed with dilute aqueous hydrochloric acid and then washed with dilute aqueous sodium hydroxide, and finally washed with water and had a pH value of 7.0, an acid value of 0, an OH value of 24.4 and contained 0.27 percent chlorine. The monomer was yellow and had a low viscosity.

EXAMPLE 3

A flask was cooled to 0° C. and to the flask were added 130 grams of 2-hydroxyethyl methacrylate, 100 grams of pyridine, and 400 milliliters of benzene. Phosgene gas was bubbled through the mixture at the rate of approximately 2 grams per minute. At the end of 28 minutes, the temperature of the reactants was 0° C. and 52 grams of phosgene had been added. The product was washed and stripped and the resulting bis-(methacryloxyethyl) carbonate monomer had an OH value of 6.3, an acid number of 0.68, a Gardner-Holdt viscosity of H- and the yield was 38 percent.

EXAMPLE 4

A flask was filled with 188 grams of acrylic acid and 1 gram of hydroquinone and heated to 110° C. To the mixture were added 1.5 grams of N-methyl morpholine. The mixture was stirred and 320 grams of glycidyl acrylate were added. The reaction was continued until the acid content was negligible. The resulting glycerol 1, 3 -diacrylate had an OH value of 208.1 and an acid number of 0.33.

A flask was charged with 104 grams of the above prepared diacrylate, 50 grams of pyridine, and 400 milliliters of benzene and cooled at 20° C. Phosgene gas was bubbled through the mixture at the rate of approximately 1 gram per minute. At the end of 34 minutes, the temperature of the reaction was 2° C. and 27 grams of phosgene has been added. The product was washed and the solvent stripped. The resulting tetra acrylate monomer had an OH value of 31.26, an acid number of 0, a Gardner-Holdt viscosity of Z5-Z6 and the yield was 70 percent.

EXAMPLE 5

A flask was charged with 226 grams of methacrylic acid and 1.2 grams of hydroquonine and heated to 110° C. To this mixture were added 1.8 grams of N-methylomorpholine and 355 grams of glycidyl methacrylate and the reactants were heated to 110° C. The reactants were heated until an acid number of 20 was reached. The resulting glycerol 1, 3 -dimethacrylate had a hydroxyl value of 254.

A flask was charged with 222 grams of the about prepared diacrylate, 100 grams of pyridine and 400 milliliters of benzene and brought to a temperature of −8° C. Phosgene gas was bubbled through the mixture at a rate of approximately 1.5 grams per minute. At the end of 32 minutes, the temperature of the reaction was −5° C. and 55 grams of phosgene had been added. The product was washed and stripped. The resulting tetra methacrylate had an acid number of 1.40, a hydroxyl value of 13.91, and a Gardner-Holdt viscosity of K-L.

EXAMPLE 6

A flask was charged with 125 grams of a 60 percent pentaerythritol triacrylate solution in pentaerythritol tetraacrylate, 25 grams of pyridine, and 400 milliliters of benzene. The temperature was brought to 3° C. and phosgene was bubbled through the solution at a rate of about 1 gram per minute. At the end of 13 minutes, the temperature was 8° C. and 14 grams of phosgene had been added. The product was filtered, washed and stripped and the resulting product had a yield of 76.3 percent.

EXAMPLE 7

A 3-mil thick coating of the product of example 1 was applied to an aluminum panel by the drawn-down method. The coated panel was then subjected to electron beam impingement in nitrogen atmosphere at an accelerating potential of 400 kv. and a tube current of 16 milliamps. The total dose given the coating was 2.5 megarads.

The coating was a hard film which was tested for stain and solvent resistance by staining for 4 hours with ink, mustard and thimerosal. The coating was found to be completely resistant to these materials.

The same procedure was used to coat substrates of wood, Lexan, vinyl plastic, and Plexiglas, at dosages of 0.4 megarad to 5.5 megarads. All of the resulting coatings were hard and had excellent adhesion and were stain and solvent resistant.

EXAMPLE 8

To the composition of example 1 was added 1 percent by weight benzoin and the composition was warmed slightly until the benzoin was completely dissolved.

A 1-mil thick coating was drawn-down on an aluminum panel and cured under ultraviolet light. The curing of the film was carried out in a nitrogen atmosphere and the film was exposed to ultraviolet light for 5 seconds using a 450 watt medium pressure mercury lamp (Hanovia Corporation). The coating cured to a hard, tack-free film.

EXAMPLE 9

A 3-mil thick coating of the composition of example 2 was coated on an aluminum panel by the drawn-down method. The coated panel was then subjected to electron beam impingement in a nitrogen atmosphere at an accelerating potential of 400 kv. and a tube current of 16 milliamps. The total does given the coating was 2.5 megarads.

The coating was a hard film which was tested for stain and solvent resistance by staining the coating with ink, mustard and thimerosal. The coating was found to be completely resistant to these materials.

The same procedure was used to coat substrates of wood, Lexan, vinyl plastic and Plexiglas at dosages of 0.4 megarad to 5.5 megarads. All coatings were hard and had excellent stain and solvent resistance.

EXAMPLE 10

To 5 grams of the composition of example 5 was added 0.05 gram of diacetyl. A 1-mil thick coating was drawn down on an aluminum panel and cured under ultraviolet light. The curing of the film was carried out in a nitrogen atmosphere and exposed to the ultraviolet light for 3 minutes using a 450 watt medium pressure mercury lamp. The coating cured to a hard, tack-free film.

EXAMPLE 11

To 5 grams of the composition of example 3 was added 0.05 gram of diacetyl. A 1-mil thick coating was drawn down on an aluminum panel and cured under ultraviolet light. The curing of the film was carried out in a nitrogen atmosphere and exposed to the ultraviolet light for 3 minutes using a 450 watt medium pressure mercury lamp. The coating cured to a hard, mar-resistant, tack-free film.

EXAMPLE 12

A 3-mil thick coating of the composition of example 4 was applied to an aluminum panel by the drawn-down method. The coated panel was then subjected to electron beam impingement in a nitrogen atmosphere at an accelerating potential of 400 kilovolts and a tube current of 14 milliamps. The total dose given the coating was 2.3 megarads. The coating cured to a hard, stain-resistant, mar-resistant and tack-free film.

EXAMPLE 13

A 3-mil thick coating of the composition of example 5 was applied to an aluminum panel by the drawn-down method. The coated panel was then subjected to electron beam impingement in a nitrogen atmosphere at an accelerating potential of 400 kvs. and a tube current of 14 milliamps. The total dose given the coating was 2.3 megarads. The coating cured to a hard, stain-resistant and mar-resistant film.

EXAMPLE 14

A 3-mil thick coating of the product of example 3 was applied to an aluminum panel by the drawn-down method. The coated panel was then subjected to electron beam impingement in a nitrogen atmosphere at an accelerating potential of 400 kilovolts and a tube current of 14 milliamps. The total dose given the coating was 5 megarads. The coating cured to a stain-resistant, mar-resistant, and tack-free film.

EXAMPLE 15

A 2-mil thick coating of the composition of example 6 was drawn down on an aluminum panel. The coated panel was then subjected to electron beam impingement in a nitrogen atmosphere and an accelerating potential of 400 kvs. and a tube current of 15 milliamps. The total dose given the coating was 2 megarads. The resulting coating was extremely hard and mar-resistant.

According to the provisions of the patent statutes, there is described above the invention and what are now considered to be its best embodiments. However, within the scope of the appended claims, it is to be understood that the invention can be practiced otherwise than as specifically described.

1. The method of forming a polymer of bis-(acryloxyalkyl) carbonates or bis-(methacryloryalkyl) carbonates comprising subjecting the reaction product of phosgene and an acrylate having the formula:

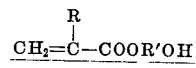

wherein R is selected from the group consisting of H and $CH_3$ and R' is selected from the group consisting of alkylene radicals, phenoxy substituted alkylene radicals, halogen substituted alkylene radicals, nitrile substituted alkylene radicals and nitro substituted alkylene radicals wherein the alkylene contains from about two to about 16 carbon atoms and wherein the reaction between the phosgene and acrylate has been carried out in the presence of an acid acceptor, to ionizing irradiation.

2. The method of claim 1 wherein the reaction product is subjected to a total dosage of from about 0.2 to about 20 megarads.

3. The method of claim 1 wherein a copolymerizable comonomer is mixed with the reaction product of phosgene and the acrylate.

4. The method of coating a substrate comprising applying to the substrate the reaction product of phosgene and an acrylate having the formula:

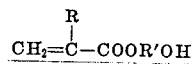

wherein R is selected from the group consisting of H and $CH_3$ and R' is selected from the group consisting of alkylene radicals, phenoxy substituted alkylene radicals, halogen substituted alkylene radicals, nitrile substituted alkylene radicals and nitro substituted alkylene radicals wherein the alkylene contains from about two to about 16 carbon atoms and wherein the reaction between the phosgene and acrylate has been carried out in the presence of an acid acceptor and subjecting the coated substrate to ionizing irradiation.

* * * * *

UNITED STATES PATENT OFFICE
CERTIFICATE OF CORRECTION

Patent No. 3,619,260      Dated November 9, 1971

Inventor(s) Gordon M. Parker

It is certified that error appears in the above-identified patent and that said Letters Patent are hereby corrected as shown below:

Column 1, line 34, after "hydroxylauryl methacrylate" add --hydroxy isooctyl acrylate, hydroxy undecyl methacrylate,--.

Column 1, line 48, "an" should be --any--.

Column 4, line 60, "about" should be --above--.

Signed and sealed this 5th day of December 1972.

(SEAL)
Attest:

EDWARD M. FLETCHER, JR.
Attesting Officer

ROBERT GOTTSCHALK
Commissioner of Patents